United States Patent [19]

Swisher et al.

[11] Patent Number: 5,515,774
[45] Date of Patent: May 14, 1996

[54] ROTARY COOKER/SMOKER

[75] Inventors: Jerald M. Swisher; Max B. Swisher, both of Warrensburg; Wayne O. Swisher, Lee's Summit, all of Mo.

[73] Assignee: Swisher Mower & Machine Co., Inc., Warrensburg, Mo.

[21] Appl. No.: 320,747

[22] Filed: Oct. 11, 1994

[51] Int. Cl.⁶ .................................................. A47J 37/04
[52] U.S. Cl. ........................... 99/340; 99/421 H; 99/427; 99/450; 99/482
[58] Field of Search ............... 99/419, 340, 421 R, 99/421 H, 421 HH, 421 HV, 421 M, 421 P, 421 TP, 421 V, 444–446, 400, 425–427, 443 C, 339; 126/25 R, 9 R

[56] References Cited

U.S. PATENT DOCUMENTS

| | | | |
|---|---|---|---|
| 2,682,830 | 7/1954 | Kupchik | 99/421 H |
| 3,103,161 | 9/1963 | Whitehead . | |
| 3,104,605 | 9/1963 | McKinney | 99/421 H |
| 3,247,827 | 4/1966 | Cremer | 99/421 H |
| 3,254,590 | 6/1966 | Watts . | |
| 3,943,837 | 3/1976 | Trkla . | |
| 4,409,452 | 10/1983 | Oouchi et al. | 126/41 B |
| 4,421,017 | 12/1983 | Ross | 99/421 R |
| 4,598,690 | 7/1986 | Hsu | 126/25 R |
| 4,810,856 | 3/1989 | Jovanovic | 99/419 |
| 4,852,476 | 8/1989 | Sanchez . | |
| 4,867,051 | 9/1989 | Schalk . | |
| 4,882,985 | 11/1989 | Belier . | |
| 4,985,607 | 1/1991 | Oya | 99/421 H |
| 5,070,777 | 12/1991 | Novak | 99/482 |
| 5,113,699 | 5/1992 | Soriano | 126/25 R |
| 5,140,896 | 8/1992 | Duran | 99/450 |
| 5,146,842 | 9/1992 | Romano . | |
| 5,184,540 | 2/1993 | Riccio . | |
| 5,205,207 | 4/1993 | McGuire . | |
| 5,333,540 | 8/1994 | Mazzocchi | 126/9 R |

OTHER PUBLICATIONS

Product literature for "The Holland Grill"; The Holland Company, Inc., Apex, North Carolina, date unknown.
Product literature for "Southern Pride" Wood Burning Barbeque Pits; B. B. Robertson Company, Rt. 2, Box 21A, Marion, Illinois, date unknown.

*Primary Examiner*—Timothy F. Simone
*Attorney, Agent, or Firm*—Litman, McMahon and Brown

[57] ABSTRACT

A rotary cooker includes a cabinet assembly having a bottom, a top, opposite sidewalls, a front wall and a back wall. A door opening is formed in the front wall and is selectively closed by a door hingedly mounted on the front wall. A spit/rotisserie assembly includes a drive shaft rotatably received in bearings mounted in the cabinet assembly sidewalls, and further includes a rotisserie selectively mounted on the drive shaft for operation in a rotisserie configuration. The rotisserie can be removed from the drive shaft for operation in a spit cooking configuration. A drive assembly includes a motor drivingly connected to the drive shaft, a battery for selectively powering the motor and a photovoltaic solar collector array for charging the battery.

16 Claims, 2 Drawing Sheets

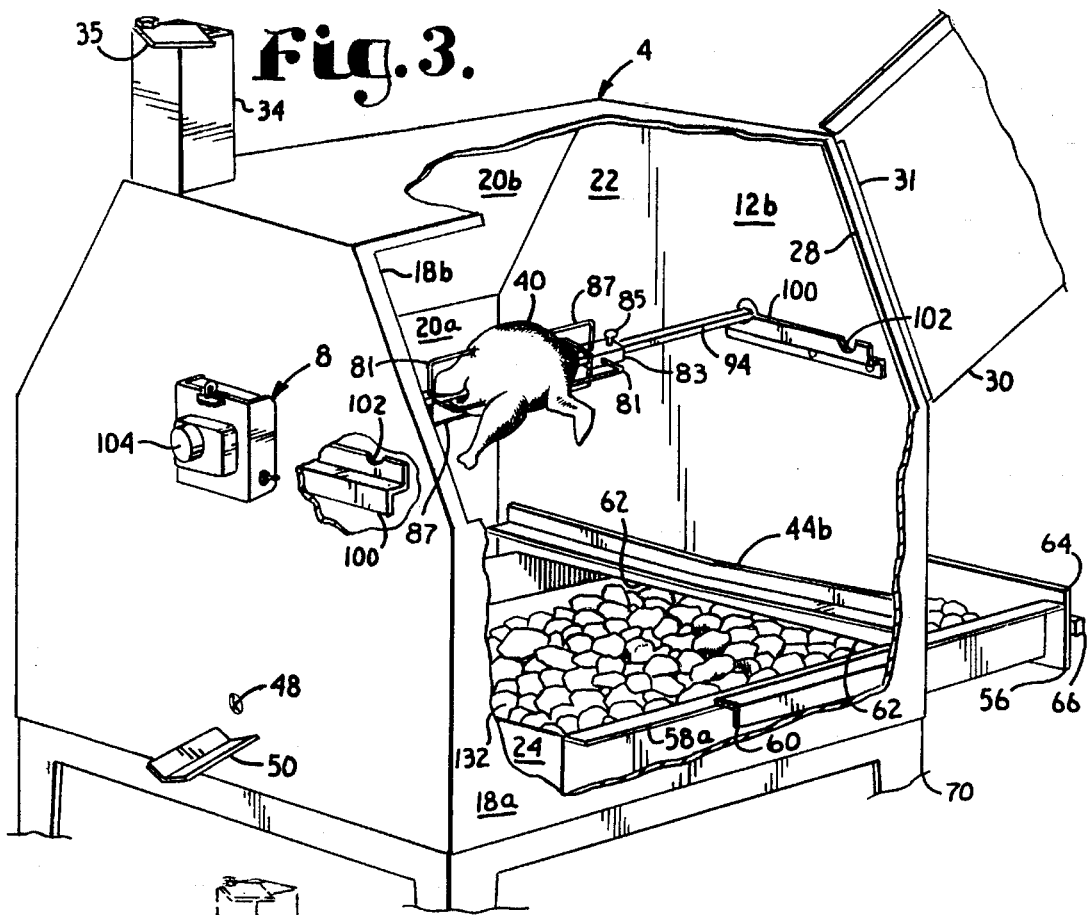
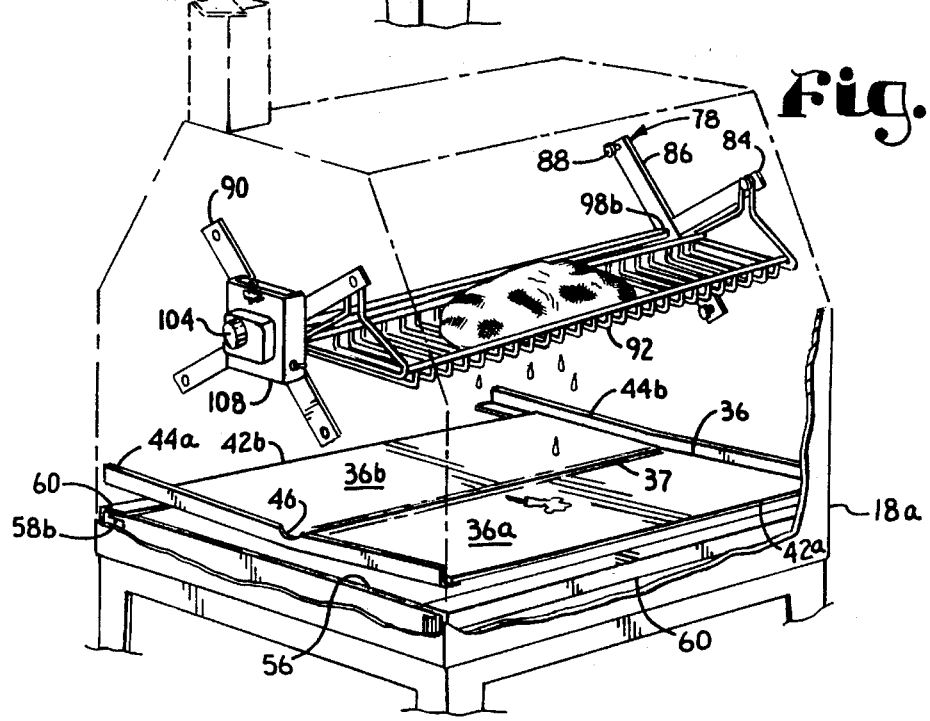

ROTARY COOKER/SMOKER

BACKGROUND OF THE INVENTION

1. Field of the Invention

The present invention relates generally to rotary cookers, and in particular to a rotary cooker/smoker which is convertible between spit cooking and rotisserie cooking configurations and which is adapted to be rotated by solar power.

2. Description of the Related Art

Various cookers have heretofore been devised for meeting the requirements of different applications. For example, a variety of cookers have been devised for cooking with charcoal, wood chips and similar fuels which tend to flavor the cook items, especially meat, poultry and fish.

Rotary cookers are well known and facilitate thorough and even cooking of cook items by rotating them. One type of rotary cooker utilizes a spit for skewering food products thereon, whereafter the spit is rotated in proximity to a heat source. Another type of rotary cooker utilizes a rotisserie for rotating multiple cook items, which can be placed on trays within a heated cooking enclosure. Rotisserie cooking can provide an automatic basting effect as food drippings from upper food items drip onto and are absorbed by lower food items as they rotate.

Heretofore various charcoal grills and other portable cooking devices have been available for cooking without an external power source. Rotary cookers, however, often relied on exterior power sources for driving their electric motors, which in turn rotated the rotating components of the cookers. However, reliance on outside power sources or manual power for rotating the spits, rotisseries and the like in such previous cookers was often a drawback.

A possible solution is to utilize solar energy, converting it to electricity and powering the cookers therewith. Photovoltaic solar collectors are available for producing electrical current from direct sunlight. A relatively large and expensive collector array would be required to produce the necessary electrical current for directly powering the electrical motor of a large rotary cooker. However, for cookers which are used only intermittently, an electrical storage battery can be provided for storing the relatively small amounts of energy produced by a smaller photovoltaic solar collector array, which energy would then be available during the relatively limited times when the cooker is in operation.

The electrical energy requirements can further be minimized by providing a relatively small electrical motor with a gear reduction drive having a relatively high ratio, thus rotating the cooker rotary components relatively slowly. Cook items can normally be rotated relatively slowly with satisfactory results. Moreover, providing a gear reduction unit with a relatively high ratio can reduce the tendency of the rotating components to coast when the motor is deenergized. Loading the trays in a rotisserie can thus be facilitated since balancing the weight is not as critical.

Heretofore there has not been available a rotary cooker with the advantages and features of the present invention.

SUMMARY OF THE INVENTION

In the practice of the present invention, a rotary cooker is provided which includes a cabinet assembly having a bottom, a top, opposite sidewalls, a front wall and a back wall. The front wall includes a door opening and hingedly mounts a door for selectively closing the opening. A baffle is mounted in the enclosure formed by the cabinet assembly and divides the enclosure into a lower combustion chamber which slidably receives a coal drawer and an upper cooking chamber. A spit/rotisserie assembly is rotatably mounted in the enclosure and includes a drive shaft which functions as a spit with the cooker in a spit configuration. A rotisserie is selectively mounted on the drive shaft for operation of the cooker in a rotisserie configuration. The rotisserie includes multiple, rotatable trays which facilitate a basting action of cook items placed thereon. A drive assembly includes a motor removably mounted on one of the sidewalls and coupled to the drive shaft. An electric storage battery selectively energizes the motor. A photovoltaic solar collector array is provided for charging the battery.

OBJECTS AND ADVANTAGES OF THE INVENTION

The principal objects and advantages of the present invention include: providing a rotary cooker which is convertible between spit and rotisserie cooking configurations; providing such a cooker which is adapted for handling various cook items; providing such a cooker which is adapted for basting the food items in a rotisserie configuration; providing such a cooker which is adapted for smoking cook items; providing such a cooker which can utilize a variety of prime movers; providing such a cooker with a prime mover comprising an electric motor; providing such a cooker which can be solar powered; providing such a cooker which can be powered by a vehicle battery; providing such a cooker which can be powered by an AC electrical circuit; providing such a cooker with adjustable ventilation; providing such a cooker which minimizes flare-ups from cook item drippings; providing such a cooker which is relatively easy to clean and maintain; providing such a cooker with a rotating spit/rotisserie assembly which tends to remain in position after a rotating force is discontinued; and providing such a cooker which is economical to manufacture, efficient in operation and particularly well-adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 3 is a fragmentary, perspective view thereof, particularly showing the system in a spit configuration thereof.

FIG. 4 is a fragmentary, perspective view thereof, particularly showing the system in a rotisserie configuration thereof.

DETAILED DESCRIPTION OF THE PREFERRED EMBODIMENTS

I. Introduction and Environment

Figure 1:
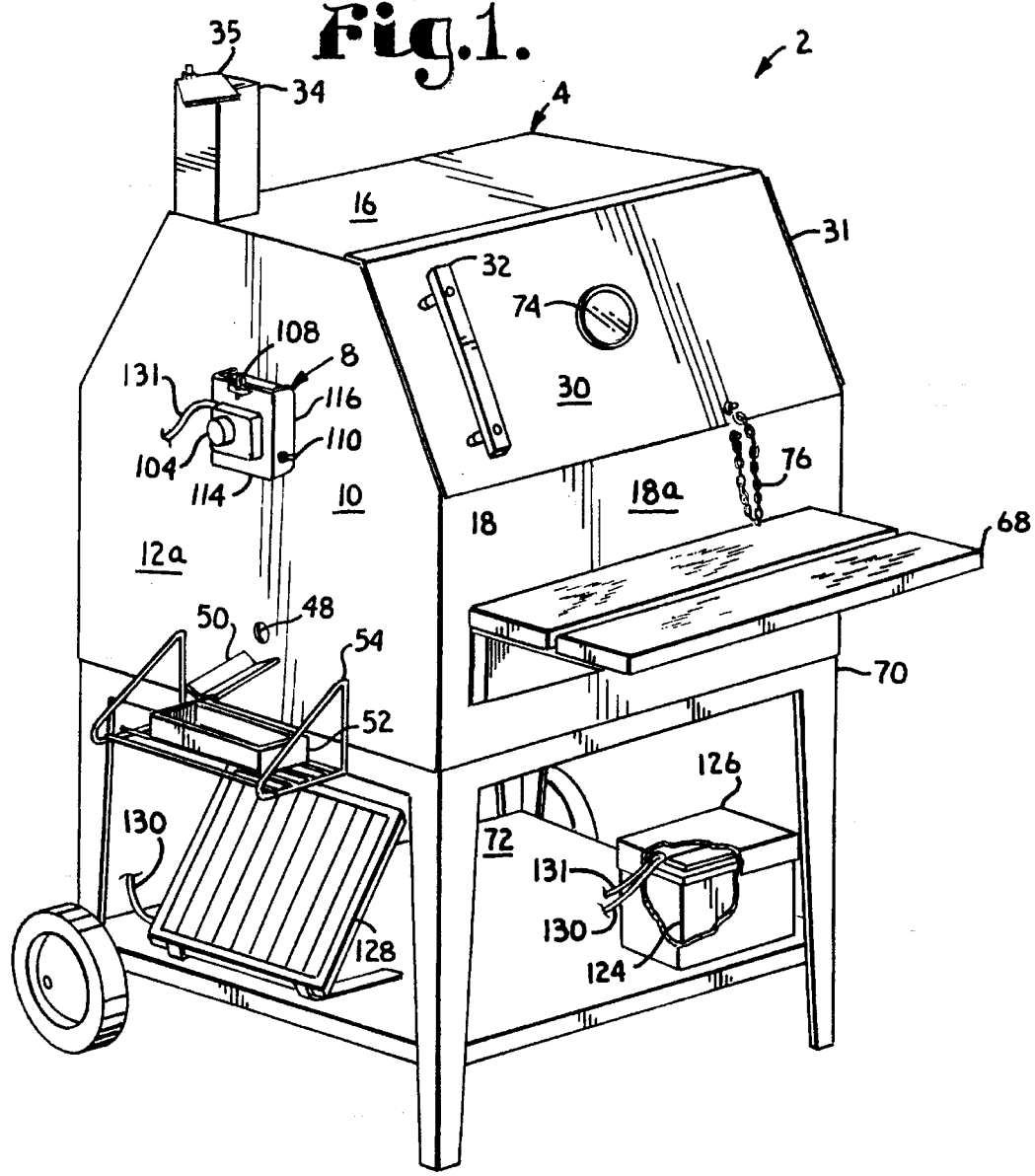
FIG. 1 is a perspective view of a rotary cooker embodying the present invention.
Figure 2:
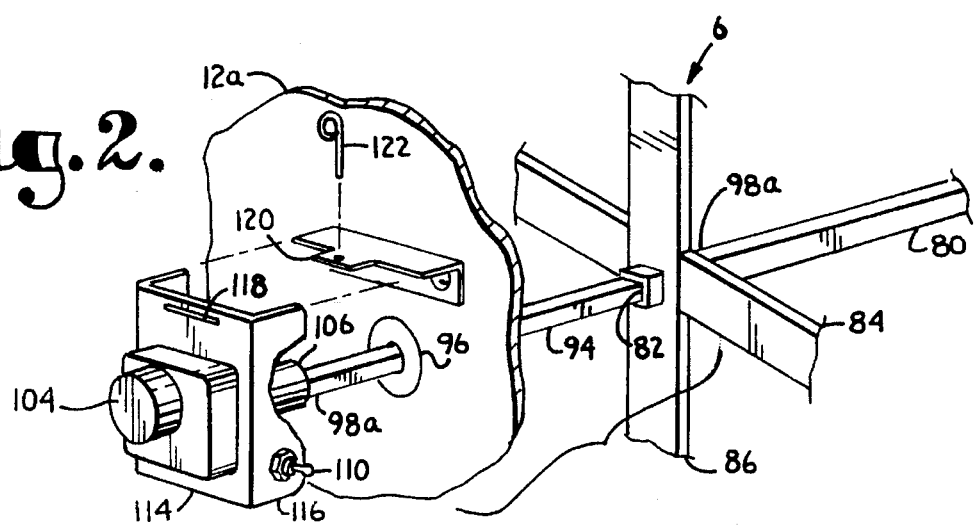
FIG. 2 is an enlarged, fragmentary, perspective view thereof, particularly showing a prime mover and its connection to a rotisserie/spit assembly thereof.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Referring to the drawings in more detail, the reference numeral 2 generally designates a rotary cooker embodying the present invention, which generally comprises a cabinet assembly 4, a rotisserie/spit assembly 6 and a drive assembly 8.

II. Cabinet Assembly 4

The cabinet assembly 4 includes a cabinet 10 with first and second sidewalls 12a, 12b positioned in generally parallel, spaced relation, a bottom 14, a top 16, a front wall 18 and a back wall 20. The bottom 14, the top 16, the front wall 18 and the back wall 20 extend between the sidewalls 12a, 12b to form an enclosure 22 with a lower combustion chamber 24 and an upper cooking chamber 26. The front wall 18 includes a lower, generally vertical panel 18a and an upper panel 18b which slopes rearwardly from bottom-to-top. Likewise the back wall 20 includes a generally vertical lower panel 20a and a sloping upper panel 20b which slopes frontwardly from bottom-to-top.

The front wall upper panel 18b includes a door opening 28 which mounts a door 30 hingedly connected thereto along one side of the opening 28 by a hinge 34 and movable between open and closed positions with respect to the door opening 28. The door 30 includes a handle 32, which can comprise a suitable material such as wood.

The top 16 mounts a ventilation flue 34 communicating with the enclosure and rotatably mounting a cap 35 for controlling the volume of exhaust gas passing through the flue 34. The ventilation flue 34 is preferably located at a rear corner of the top 16 to maximize the available free surface on the top 16 for placing food, containers, etc. thereon for warming while the rotary cooker 2 is in use.

The cabinet assembly 4 forms an enclosure 22 including a lower, combustion chamber 24 and an upper, cooking chamber 26. A baffle 36 generally separates the chambers 30, 32 and includes a pair of sections 36a, 36b generally forming a relatively shallow dihedral angle and joined along a fold line 37 which extends generally between the sidewalls 12a, 12b and forms a drainage channel for drippings 38 from cook items 40.

The baffle plate 36 is slightly narrower from front-to-back than the enclosure 22 whereby front and rear smoke exhaust passages 42a, 42b are formed between the front and back walls 18, 20 and the baffle sections 36a, 36b respectively.

The baffle 36 is removably mounted in the enclosure 22 by first and second angle member baffle brackets 44a, 44b mounted on sidewalls 12a, 12b, baffle bracket 44a including a center notch 46 which communicates with a discharge opening 48 in the sidewall 12a, which in turn is located over a discharge trough 50 which extends outwardly and downwardly from the sidewall 12a. A drippings receptacle 52 can be placed under the discharge trough 50 and supported on the outside of the cabinet assembly 4 by a suitable drippings receptacle shelf 54 mounted on the cabinet sidewall 12a.

A coal drawer 56 is slidably received in the cabinet combustion chamber 24 and includes a pair of front and rear flanges 58a, 58b which slidably engage angle section guide members 60 mounted on the front and back walls 18, 20 respectively. A coal drawer opening 62 is formed in the sidewall 12b and slidably receives the coal drawer 56. The coal drawer 56 includes a face plate 64 adapted for engaging the sidewall 12b with the coal drawer 56 in its closed position and mounting a handle 66.

A work shelf 68 is mounted on the front wall lower panel 18a. The cabinet 10 is supported by a stand 70 with a shelf 72. The door 30 mounts a thermometer 74 and is restricted in its opening swing by a restraining chain 76.

III. Rotisserie/Spit Assembly 6

The rotisserie/spit assembly 6 includes a rotisserie 78 with a square, hollow tube 80 including a bore 82 with a square cross-sectional configuration. Each end of the tube 80 mounts an X-bracket 84 with four arms 86 located at 90° intervals with respect to each other and each mounting a pin 88 in proximity to an outer end 90 thereof, with the pins 88 projecting into the cooking chamber 26.

Respective pairs of pins 88 mount rotisserie trays 92 which can comprise any suitable configuration, such as the open wire basket configuration shown. Since each tray 92 is rotatably mounted on a pair of pins 88, it will maintain a generally upright configuration as the rotisserie 78 rotates.

A spit/drive shaft 94 has a generally square cross-sectional configuration corresponding to the configuration of the rotisserie tube 80 and is slidably removably received therein.

A pair of bearings 96 are mounted in the sidewalls 12a, 12b and each receives a respective spit/drive shaft end 98a, 98b. A pair of rotisserie support members 100 are mounted on the sidewalls 12a, 12b and are notched at 102 for supporting the rotisserie 78 generally in alignment with the bearings 96 whereby the rotisserie tube bore 82 is approximately in proper alignment with the bearings 96 when the spit/drive shaft 94 is inserted into the rotisserie tube 80 and withdrawn therefrom. The rotisserie 78 is slidable along the rotisserie support members 100 during installation and removal. The rotisserie support members 100 thus facilitate assembly of the rotary cooker 2 and conversion thereof between rotisserie and spit configurations.

IV. Drive Assembly 8

The drive assembly 8 includes a prime mover 104 connected to the spit/drive shaft 94 by a coupling 106. Although the prime mover 104 is shown and described as a DC electric motor with a gear reduction drive, various other drive means could be utilized, such as an AC motor, a hand crank, etc.

The motor 104 is mounted in a motor mount 108 which mounts an on/off switch 110. The motor mount has a generally U-shaped configuration with a connecting plate 114 mounting the motor and a pair of side plates 116 extending therefrom to the cabinet sidewall 12a. The connecting plate 114 includes a slot 118 selectively receiving a tab 120 mounted on and extending from the sidewall 12a. The tab 120 is selectively securable in the slot 118 by means of a retaining pin 122.

An electrical storage battery 124 (e.g. 12 V) is selectively connected to the motor 104 through the switch 110 and is located in a battery storage box 126 for weather protection, which can be placed on the shelf 72. A photovoltaic solar collector array 128 is connected to the battery 124 by electrical charging lead 130. The battery 124 is selectively connected to the motor 104 through the switch 110 by a power lead 131. The motor 104 can be powered by alternating current through a suitable transformer (not shown) which can be provided with a different power lead 131 for this purpose. Alternatively, the power lead 131 could comprise a cord with a plug for attachment to an alternating current power source in the event an AC motor were utilized.

The drive system components, i.e., the motor 104, the battery 124 and the photovoltaic array 128, can be sized and otherwise designed to accommodate a variety of operating conditions. For example, more continuous operation could be accommodated with a larger solar collector and/or a larger battery with a backup charging source, such as a battery charger (not shown).

V. Operation

In operation, the rotary cooker 2 operates effectively in either a spit configuration (FIG. 3) or a rotisserie configuration (FIG. 4), and can be readily converted therebetween. The motor 104 and its mount 108 can be separated from the sidewall 12a by removing the retaining pin 122 and withdrawing the tab 120 from the slot 118. The spit/drive shaft 94 can thus be extracted from the rotisserie 78 and the enclosure 22, with the motor 104 attached thereto by coupling 106. With the spit/drive shaft 104 extracted, the rotisserie 78 can remain within the enclosure 22, supported on the rotisserie support members 100, and can also be removed from the enclosure 22.

The spit/drive shaft 94 is adapted for slidably receiving one or more (e.g., two are shown) spit accessories 81 including a sleeve 83 slidably receiving the spit/drive shaft 94 and removably securable thereto by a thumb set screw 85. A plurality of L-shaped tines 87 are mounted on the sleeve 83 and extend radially outwardly therefrom at radial intervals of approximately 90°. The tines 87 extend in directions generally parallel to the spit/drive shaft 94 and their ends are adapted for embedding in a cook item 40, as shown in FIG. 3. The spit accessories 81 can be used in multiples for securing one or more cook items 40 on the spit/drive shaft 94, or a single spit accessory 81 can be employed. Moreover, the spit accessories 81 can assume a variety of configurations and can be provided with various numbers of tines 87 to accommodate particular cooking conditions and cook items 40.

As discussed above, various prime movers and power sources can be utilized, including solar power, direct current, alternating current, etc. Moreover, a DC motor comprising the prime mover 104 can be powered by a vehicle battery by plugging a suitable adaptor into the vehicle's cigarette lighter socket, thus adapting the rotary cooker 2 for portable operation in conjunction with a vehicle.

The rotating speed of the prime mover 104 can be relatively slow, e.g., about one-half of a revolution per minute (0.5 rpm). A relatively slow rotating speed can facilitate basting of cook items 40 on the rotisserie trays 92, since juices therefrom tend to drip onto cook items 40 therebelow due to the open construction of the trays 92. To achieve such a relatively low rotational speed, the prime mover 104 can be provided with a gear reduction of about 600 to 1 whereby a 300 rpm motor would produce the desired rotational speed. The relatively high gear reduction ratio serves another purpose in that it can resist "coasting" of the rotisserie/spit assembly 6 when the power to the prime mover 104 is cut. Thus, the prime mover 104 can be turned off with the switch 110 and the rotisserie/spit assembly 6 will stop relatively quickly. An operator can thus start and stop the rotation of the rotisserie 78 or the spit/drive shaft 94 at approximately any desired position for handling the cook items 40. Moreover, even with the rotisserie 78 unevenly loaded, the aforementioned relatively high gear ratio resists rotation whereby the rotisserie trays 92 tend to remain in fixed positions while being loaded and unloaded with cook items 40.

The design of the baffle 36 and combustion chamber 24 tend to reduce "flare-ups", which could otherwise occur with meat drippings falling directly on a coal fire. Such drippings tend to fall on lower cook items 40 for a basting effect and also on to the baffle 36 where they contribute to flavoring the cook items 40 by combining smoke from such drippings with the smoke from the cooking fire.

The rotary cooker 2 thus is adapted for functioning as a smoker, the operation of which can be controlled and varied by varying the fuel 132, by adjusting the flue cap 35 for controlling smoke ventilation, etc.

It is to be understood that while certain forms of the present invention have been illustrated and described herein, it is not to be limited to the specific forms or arrangement of parts described and shown.

What is claimed and desired to be secured by Letters Patent is as follows:

1. A rotary cooker/smoker for a cook item, which comprises:
   (a) a cabinet assembly including:
      (1) a first sidewall;
      (2) a second sidewall positioned opposite said first sidewall;
      (3) a bottom extending between said sidewalls;
      (4) a top extending between said sidewalls and including a vent opening;
      (5) a front wall extending between said sidewalls and including a door opening;
      (6) a back wall extending between said sidewalls;
      (7) a door mounted on said front wall and movable between open and closed positions with respect to said door opening;
      (8) an enclosure formed by said cabinet top, bottom and walls, and including a lower combustion chamber and an upper cooking chamber;
      (9) a baffle mounted in said enclosure and generally separating said combustion and cook chambers; and
      (10) a coal drawer slidably, selectively positioned in said cooking chamber between said baffle and said bottom;
   (b) a rotisserie/spit assembly, which includes:
      (1) first and second bearings mounted on said first and second sidewalls respectively;
      (2) a spit/drive shaft selectively, rotatably received in said bearings;
      (3) a rotisserie including a tube selectively receiving said drive shaft;
   (c) a drive assembly including a motor, a motor mount mounting said motor on one of said cabinet assembly sidewalls and coupling means coupling said motor to said drive shaft; and
   (d) said cooker being convertible between a spit configuration with said rotisserie removed from said drive shaft and a rotisserie configuration with said rotisserie mounted thereon.

2. The invention of claim 1 wherein said spit/drive shaft has a square cross-sectional configuration.

3. The invention of claim 1 wherein said drive assembly includes an electrical storage battery, an on/off switch and an electrical power cable selectively connecting said battery to said motor through said switch.

4. The invention of claim 3 wherein said drive assembly includes a photovoltaic solar collector and a charging cable electrically coupling said solar collector and said battery.

5. The invention of claim 1 wherein said drive assembly includes an electric motor with a gear reduction unit.

6. The invention of claim 1 wherein said baffle includes first and second sections forming a dihedral angle, each said section extending upwardly and outwardly toward a respective cabinet front wall or back wall from a fold line.

7. The invention of claim 6 wherein each said baffle section terminates in spaced relation from a respective front wall or back wall.

8. A rotary spit cooker/rotisserie cooker/smoker for a cook item, which comprises:

(A) a cabinet assembly including:
  (1) a first sidewall;
  (2) a second sidewall positioned opposite said first sidewall;
  (3) a bottom extending between said sidewalls;
  (4) a top extending between said sidewalls and including a vent opening;
  (5) a front wall extending between said sidewalls and including a lower vertical panel and an upper sloping panel, said front wall upper panel having a door opening;
  (6) a back wall extending between said sidewalls and including a generally vertical lower panel and a sloping upper panel, said front and back wall upper panels converging toward said top;
  (7) a door hingedly mounted on said front wall upper panel in proximity to one of said sidewalls, said door being movable between open and closed positions with respect to said door opening;
  (8) an enclosure formed by said cabinet top, bottom and walls and including a lower combustion chamber and an upper cooking chamber;
  (9) first and second baffle support members each mounted on a respective sidewall;
  (10) door restraining means restraining the swinging movement of said door in its open position;
  (11) a baffle including front and back sections forming a relatively shallow dihedral angle, said baffle including a fold line with said baffle sections being joined along said fold line, said baffle being removably mounted on said baffle support members and sloping from side-to-side whereby drippings from said cook item flow toward one of said sidewalls along said baffle fold line;
  (12) said baffle being narrower than a front-to-back dimension of said enclosure;
  (13) front and back smoke exhaust passages between said front and back walls and said baffle sections respectively;
  (14) a respective sidewall at the lower side of said baffle having an opening communicating with said baffle fold line and adapted for passing drippings from said enclosure;
  (15) drippings collection means mounted on said one sidewall;
  (16) the other said sidewall including a coal drawer opening;
  (17) a coal drawer slidably, selectively extending through said coal drawer opening and positioned in said combustion chamber between said bottom and said baffle;
  (18) a work shelf mounted on said front wall lower panel;
  (19) a ventilation flue mounted on said top in communication with said exhaust opening, said ventilation flue being mounted at a rear corner of said top;

(b) a rotisserie/spit assembly including:
  (1) a pair of bearings each mounted on a respective cabinet assembly sidewall;
  (2) a drive shaft with a square cross-sectional configuration selectively extending between and rotatably received in said bearings;
  (3) a rotisserie including a tube with a bore having a square cross-sectional configuration selectively receiving said drive shaft, four arms mounted at each end of said rotisserie tube and extending radially from a rotational axis thereof at approximately 90° intervals, a plurality of pins each mounted on a respective rotisserie arm end and projecting inwardly therefrom, and four trays rotatably mounted on said rotisserie arm pins, each said tray extending substantially transversely across said enclosure between the sidewalls thereof;

(c) a pair of rotisserie support members each mounted on a respective cabinet assembly sidewall within said enclosure, each said rotisserie support member including a notch positioned below a respective bearing; and (d) a drive assembly including:
  (1) a prime mover comprising a DC electric motor and gear reduction drive;
  (2) a coupling drivingly connected to said electric motor and to said drive shaft;
  (3) a motor mount including a slot;
  (4) a tab mounted on one of said cabinet assembly sidewalls and extending laterally therefrom and including a receiver;
  (5) said tab being received in a slot of said motor mount with said prime mover mounted on said cabinet assembly sidewall;
  (6) a retaining pin selectively received in said tab receiver for mounting said prime mover on said cabinet assembly sidewall;
  (7) an on/off switch mounted in said motor mount;
  (8) an electrical storage battery;
  (9) an electrical power lead selectively connecting said battery and said motor through said switch;
  (10) a photovoltaic solar collector array;
  (11) a charging lead connecting said solar collector array and said battery.

9. A rotary cooker for a cook item, which comprises:

(a) a cabinet assembly including:
  (1) a first sidewall;
  (2) a second sidewall positioned opposite said first sidewall;
  (3) a bottom extending between said sidewalls;
  (4) a top extending between said sidewalls;
  (5) a vent opening;
  (6) a front wall extending between said sidewalls;
  (7) a door opening;
  (8) a back wall extending between said sidewalls;
  (9) a door movable between open and closed positions with respect to said door opening;
  (10) an enclosure formed by said cabinet top, bottom and walls and including a lower combustion chamber and an upper cooking chamber; and
  (11) baffle means separating said combustion and cooking chambers;

(b) a rotisserie assembly, which includes:
  (1) first and second bearings mounted on said first and second sidewalls respectively; and
  (2) cook item retaining means extending between said bearings for retaining the cook item; and
(c) a drive assembly drivingly connected to said rotisserie assembly;
(d) said rotisserie assembly includes a coaxial shaft extending between said bearings and a rotisserie receiving said shaft; and
(e) said shaft has square cross-sectional configuration and said rotisserie includes a coaxial tube with a bore selectively receiving said shaft.

10. The invention of claim 9 wherein said drive assembly includes an electric motor with a gear reduction unit.

11. A rotary cooker for a cook item, which comprises:
(a) a cabinet assembly including:
  (1) a first sidewall;
  (2) a second sidewall positioned opposite said first sidewall;
  (3) a bottom extending between said sidewalls;
  (4) a top extending between said sidewalls;
  (5) a vent opening;
  (6) a front wall extending between said sidewalls;
  (7) a door opening;
  (8) a back wall extending between said sidewalls;
  (9) a door movable between open and closed positions with respect to said door opening;
  (10) an enclosure formed by said cabinet top, bottom and walls and including a lower combustion chamber and an upper cooking chamber; and
  (11) baffle means separating said combustion and cooking chambers;
(b) a rotisserie assembly, which includes:
  (1) first and second bearings mounted on said first and second sidewalls respectively; and
  (2) cook item retaining means extending between said bearings for retaining the cook item; and
(c) a drive assembly drivingly connected to said rotisserie assembly
(d) said rotisserie assembly includes a coaxial shaft extending between said bearings and a rotisserie receiving said shaft; and
(e) said rotary cooker is convertible between a spit configuration with said rotisserie assembly removed from said coaxial shaft and a rotisserie configuration with said rotisserie mounted on said shaft.

12. The invention of claim 11 wherein said drive assembly comprises an electric motor mounted on a respective cabinet assembly sidewall and a coupling drivingly connected to said motor and said shaft.

13. The invention of claim 12 wherein said drive assembly includes an electrical storage battery, an on/off switch and an electrical power cable selectively connecting said battery to said motor through said switch.

14. The invention of claim 13 wherein said drive assembly includes a photovoltaic solar collector and a charging cable electrically coupling said solar collector and said battery.

15. A rotary cooker for a cook item, which comprises:
(a) a cabinet assembly including:
  (1) a first sidewall;
  (2) a second sidewall positioned opposite said first sidewall;
  (3) a bottom extending between said sidewalls;
  (4) a top extending between said sidewalls;
  (5) a vent opening;
  (6) a front wall extending between said sidewalls;
  (7) a door opening;
  (8) a back wall extending between said sidewalls;
  (9) a door movable between open and closed positions with respect to said door opening;
  (10) an enclosure formed by said cabinet top, bottom and walls and including a lower combustion chamber and an upper cooking chamber; and
  (11) baffle means separating said combustion and cooking chambers;
(b) a rotisserie assembly, which includes:
  (1) first and second bearings mounted on said first and second sidewalls respectively; and
  (2) cook item retaining means extending between said bearings for retaining the cook item; and
(c) a drive assembly drivingly connected to said rotisserie assembly; and
(d) said baffle means includes first and second sections forming a dihedral angle, each said section extending upwardly and outwardly toward a respective cabinet front wall or back wall from a fold line.

16. The invention of claim 15 wherein each said baffle section terminates in spaced relation from a respective front wall or back wall.

* * * * *